United States Patent [19]

Osawa

[11] Patent Number: 5,339,781
[45] Date of Patent: Aug. 23, 1994

[54] ELECTRONIC GOVERNOR OF FUEL SUPPLYING DEVICE FOR ENGINE

[75] Inventor: Tomio Osawa, Saitama, Japan

[73] Assignee: Zexel Corporation, Tokyo, Japan

[21] Appl. No.: 43,859

[22] Filed: Apr. 7, 1993

[30] Foreign Application Priority Data

Apr. 15, 1992 [JP] Japan ................... 4-121287

[51] Int. Cl.$^5$ ............................. F02D 31/00
[52] U.S. Cl. ............................. 123/357
[58] Field of Search ................ 123/357, 339

[56] References Cited

U.S. PATENT DOCUMENTS

| | | | |
|---|---|---|---|
| 4,640,241 | 2/1987 | Matsunaga | 123/357 |
| 4,709,335 | 11/1987 | Okamoto | 123/357 |
| 4,766,863 | 8/1988 | Fujimori | 123/357 |
| 4,779,595 | 10/1988 | Fujimori | 123/357 |
| 5,031,594 | 7/1991 | Morikawa | 123/339 |
| 5,144,915 | 9/1992 | Grabs | 123/683 |
| 5,152,266 | 10/1992 | Sekiguchi et al. | 123/357 |

FOREIGN PATENT DOCUMENTS

| | | | |
|---|---|---|---|
| 129776 | 2/1985 | European Pat. Off. | |
| 59-170437 | 9/1984 | Japan | 123/357 |
| 60-190639 | 9/1985 | Japan | |
| 60-190640 | 9/1985 | Japan | |
| WOA191092-20 | 6/1991 | World Int. Prop. O. | |

*Primary Examiner*—David A. Okonsky

[57] ABSTRACT

An electronic governor of a fuel supplying device for an engine is disclosed. The governor is operated to control an adjustment member for adjusting an amount of supply of fuel to the engine. In a target idling position arithmetic circuit, a primary arithmetic circuit calculates a primary target position of the adjustment member in accordance with the detected rotational speed of the engine with reference to a predetermined relation between the rotational speed of the engine and the position of the adjustment member where the supply amount of fuel is reduced as the rotational speed of the engine is increased. A first correction circuit corrects the primary target position by using a first position correction component in a fuel supply amount increasing direction, such that the detected rotational speed of the engine is coincident with a target idling rotational speed. A second correction circuit corrects the primary target position by using a second position correction component in a fuel supply amount reducing direction in such a manner as to correspond to the position of the adjustment member detected by a position detection circuit when the idling control is undergoing.

7 Claims, 3 Drawing Sheets

ELECTRONIC GOVERNOR OF FUEL SUPPLYING DEVICE FOR ENGINE

BACKGROUND OF THE INVENTION

This invention relates to an electronic governor of a fuel supplying device for an engine.

As disclosed in Japanese Laid-Open Patent Publication No. 190639/85, a fuel supplying device for supplying fuel to a diesel engine comprises a fuel injection pump and an electronic governor. The fuel injection pump has an adjustment member as indicated by the reference numeral 7 in FIG. 1 of the above Publication (this numeral 7 as well as other numerals in FIG. 1 of the above Publication will be used in the following description). An injection amount of fuel from the fuel injection pump is determined by a position of the adjustment member. The electronic governor is operated to control the position of the adjustment member 7. The electronic governor comprises a position detection circuit 11 for detecting the position of the adjustment member 7, a rotational speed detection circuit 4 for detecting a rotational speed of the engine, and an accelerator operation amount detection circuit 3 for detecting an accelerator operation amount.

The electronic governor of the above Publication further comprises a target position arithmetic circuit 5, and position control circuits 8 and 9. The position control circuit is operated to control the position of the adjustment member 7 such that the position of the adjustment member 7 detected by the position detection circuit 11 is coincident with a target position calculated by the target position arithmetic circuit 6.

The target position arithmetic circuit 6 comprises a primary arithmetic circuit 12. The primary arithmetic circuit is operated to calculate a primary target position of the adjustment member such that the supply amount of fuel is reduced as the rotational speed of the engine is increased in accordance with predetermined relations between the rotational speed of the engine and the position of the adjustment member. As shown in FIG. 2 of the above Publication, the predetermined relations between the rotational speed of the engine and the position of the adjustment member are represented by different lines which are drawn for different accelerator operation amounts respectively and the target position of the adjustment member is shifted in a fuel supply amount increasing direction as the accelerator operation amount is increased. When the accelerator operation amount is not zero (in other words, when an idling operation is not undergoing), the primary target position is served, in principle, as a final target position.

When the idling control is undergoing, the electronic governor of the above Publication controls the adjustment member such that the rotational speed of the engine becomes constant. As a construction for achieving the foregoing, the target position arithmetic circuit 6 comprises a PI arithmetic circuit and an adder circuit 17 which co-act with the primary arithmetic circuit 12. This PI arithmetic circuit 16 performs a PI calculation in accordance with a deviation between a constant target idling rotational speed and the rotational speed detected by the rotational speed detection circuit. By adding the result of the PI calculation to the primary target position, the adder circuit 17 corrects the primary target position of the adjustment member in the fuel supply amount increasing direction.

The PI arithmetic circuit 16 normally outputs a zero or plus calculation result. Therefore, when the accelerator pedal is released to bring the accelerator operation amount to zero at the time the accelerator operation amount is large, the function of the PI arithmetic circuit 16 is substantially stopped. More specifically, at the time when the accelerator pedal is released, a rotational speed to be detected is still on a higher level than the target idling rotational speed. Therefore, provided that the PI arithmetic circuit can output a minus calculation result, the calculation result at the time when the accelerator pedal is released is increased in a minus direction. If the primary target position is corrected using this calculation result, the rack position is extremely shifted in the fuel supply amount reducing direction, with the result that an undershoot of the fuel injection amount occurs.

The primary target position (hereinafter referred to as the "base position") obtainable at the target idling rotational speed with reference to the line indicative of the relations between the engine rotational speed and the adjustment member position is somewhat shifted in the fuel supply amount reducing direction from the position of the adjustment member required for maintaining the target idling rotational speed. As a result, when the idling control is undergoing, the PI arithmetic circuit 16 is normally effectively functioned. Since the result of the PI calculation is normally added to the base position, the engine rotational speed can be maintained to the target idling rotational speed.

However, when the fuel supplying device of the above Publication is used for a long period of time, it gives rise to such a problem that at the time when the idling control is undergoing, the engine rotational speed becomes unstable. This problem is guessed to be occurred because of the following reasons. That is, the engine is provided with injection nozzles for injecting high pressure fuel discharged from the fuel injection pump into engine cylinders. Each injection nozzle comprises a needle valve for opening and closing an injection port, and a nozzle spring for biasing the needle valve in a closing direction. When fuel pressure from the fuel injection pump becomes higher than a valve opening pressure defined by the nozzle spring, the needle valve opens its injection port to inject the fuel into the engine cylinder. When the injection nozzle is used for a long period of time, the nozzle spring is deteriorated with the passage of time and as a result, the valve opening pressure is lowered. When the valve opening pressure of the nozzle is lowered, the fuel injection amount is increased because the injection portion is open for a long period of time. As a result, when the adjustment member is at the base position, a larger amount of fuel than the fuel injection amount required for maintaining the target idling rotational speed is injected from the fuel injection pump. As a consequence, a satisfactory function of the PI arithmetic circuit 16 is unobtainable, and the target position of the adjustment member is determined chiefly with reference to the line indicative of the relation between the engine rotational speed and the adjustment member position. As a consequence, the engine rotational speed is greatly fluctuated.

SUMMARY OF THE INVENTION

It is therefore an object of the present invention to provide an electronic governor of a fuel supplying device for an engine in which when an idling control is undergoing, a rotational speed of the engine can stably be maintained in the level of a target idling rotational speed even after the fuel supplying device is used for a long period of time.

According to the present invention, there is provided an electronic governor of a fuel supplying device for an engine, the governor being operated to control an adjustment member for adjusting an amount of supply of fuel to the engine, comprising:

(a) position detection means for detecting a position of the adjustment member;

(b) rotational speed detection means for detecting a rotational speed of the engine;

(c) accelerator operation amount detection means for detecting an operation amount of an accelerator;

(d) target position arithmetic means for calculating a target position of the adjustment member in accordance with the detected operation amount of the accelerator and also with the detected rotational speed of the engine; and (e) position control means for controlling the position of the adjustment member so that the position of the adjustment member detected by the position detection means is coincident with the target position calculated by the target position arithmetic means;

wherein the target position arithmetic means includes target idling position arithmetic means for calculating the target position of the adjustment member when the operation amount of the accelerator is zero, the target idling position arithmetic means comprising:

(i) primary arithmetic means for calculating a primary target position of the adjustment member in accordance with the detected rotational speed of the engine with reference to a predetermined relation between the rotational speed of the engine and the position of the adjustment member where the supply amount of fuel is reduced as the rotational speed of the engine is increased;

(ii) first correction means for correcting the primary target position by using a first position correction component in a fuel supply amount increasing direction, such that the rotational speed of the engine detected by the rotational speed detection means is coincident with a target idling rotational speed; and (iii) second correction means for correcting the primary target position by using a second position correction component in a fuel supply amount reducing direction in such a manner as to correspond to the position of the adjustment member detected by the position detection means when an idling control is undergoing.

DETAIL DESCRIPTION OF THE EMBODIMENT

One embodiment of the present invention will be described hereinafter with reference to the accompanying drawings.

Figure 1:
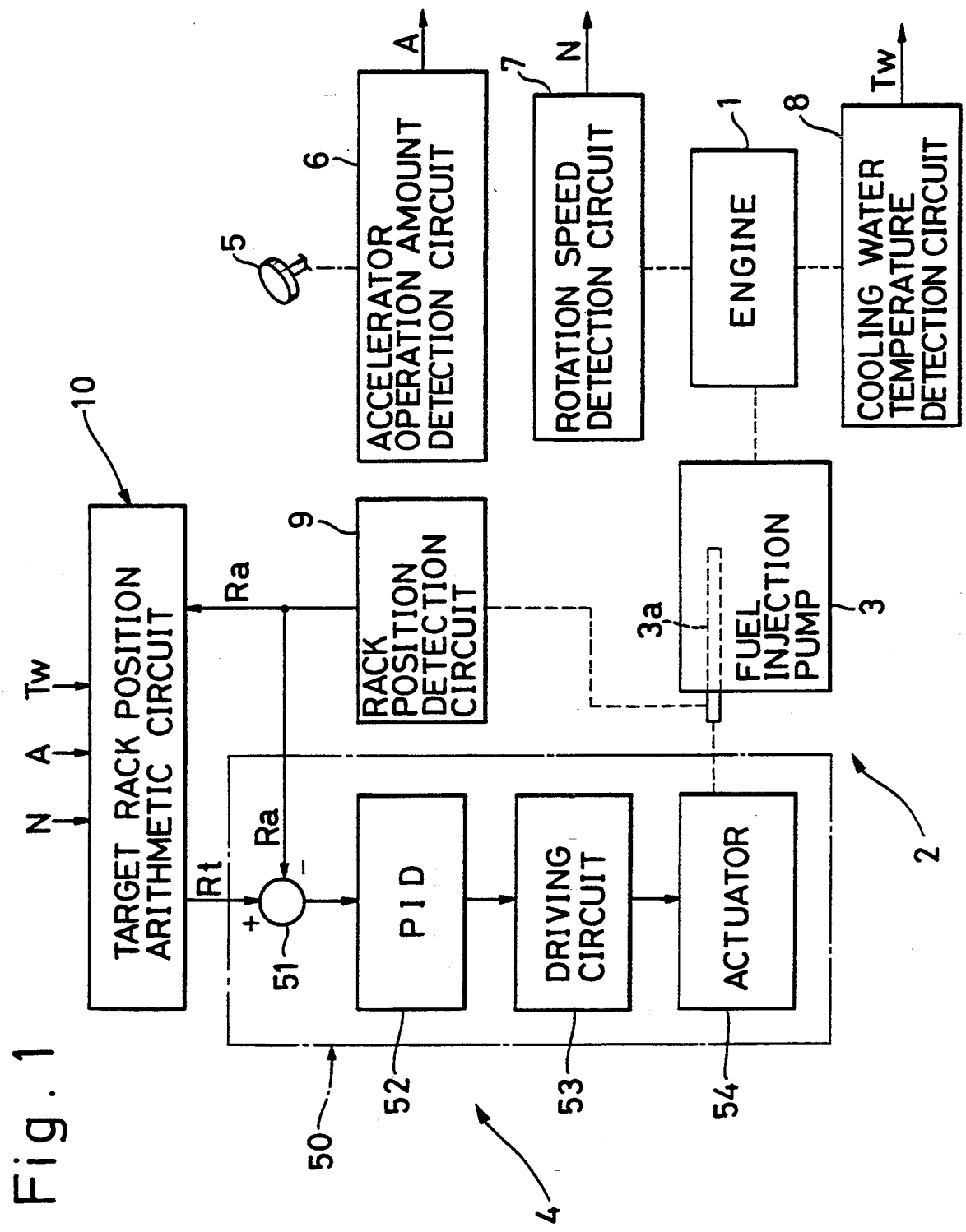
FIG. 1 is a block diagram of an electronic governor according to one embodiment of the present invention.

FIG. 1 shows a fuel supplying device 2 for supplying fuel to a diesel engine 1. The fuel supplying device 2 comprises an in-line type fuel injection pump 3, injection nozzles (not shown) mounted on the engine 1 and adapted to inject high pressure fuel fed from the fuel injection pump 3 through pipes to engine cylinders, and an electronic governor 4. The fuel injection pump 3 has a control rack 3a (adjustment member). An injection amount of the fuel from the fuel injection pump 3 is determined by a position of this control rack 3a. In the following description, the position of the control rack 3a (hereinafter referred to as the "rack position") is represented by a numerical value which increases as the control rack 3a is shifted in a fuel supply amount increasing direction. The electronic governor 4 is operated to control the position of the control rack 3a.

The electronic governor 4 comprises an accelerator operation amount detection circuit 6 (accelerator operation amount detection means) for detecting an operation amount A of an accelerator pedal 5, a rotational speed detection circuit 7 (rotational speed detection means) for detecting a rotational speed N of the engine 1, a cooling water temperature detection circuit 8 for detecting an engine cooling water temperature Tw, and a rack position detection circuit 9 (position detection means) for detecting an actual position Ra (hereinafter referred to as the "actual rack position") of the control rack 3a.

The electronic governor 4 further comprises a target rack position arithmetic circuit 10 (target position arithmetic means) for calculating a target position Rt of the control rack 3a (hereinafter referred to as the "target rack position"), and a position control circuit 50 (position control means). The position control circuit 50 is operated to control the control rack 3a such that the actual rack position Ra of the control rack 3a detected by the rack position detection circuit 9 is coincident with the target rack position Rt calculated by the target rack position arithmetic circuit 10. More specifically, in the position control circuit 50, a deviation between the target rack position Rt and the actual rack position Ra is calculated by a deviation arithmetic circuit 51. In accordance with the deviation from the deviation arithmetic circuit 51, a PID calculation (proportional, integral, and differential calculation) is performed in a PID arithmetic circuit 52, and a result of the calculation is outputted to a driving circuit 53. Consequently, an electromagnetic actuator 54 is actuated to control the control rack 3a so as to be brought to the target rack position Rt.

Figure 2:
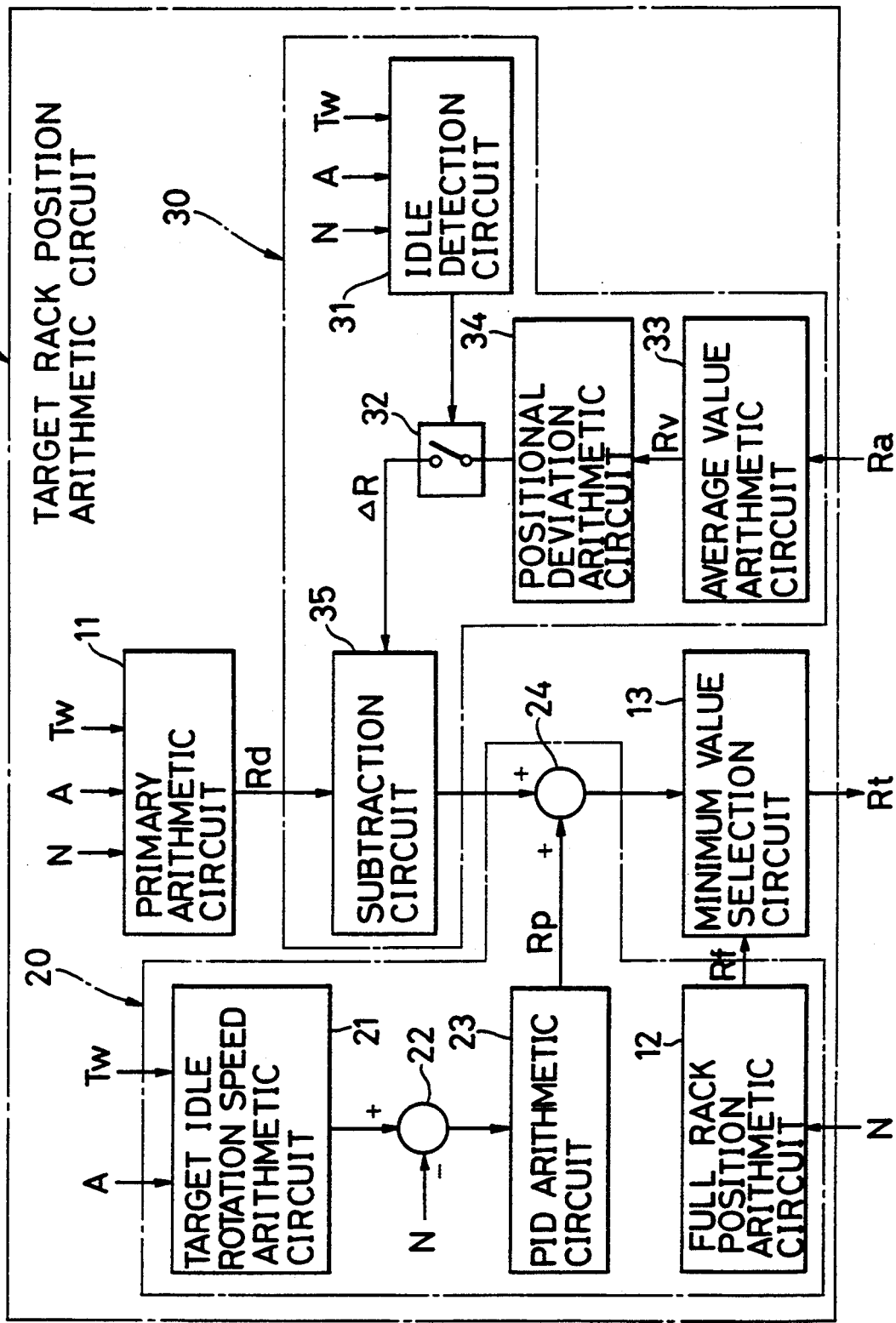
FIG. 2 is a circuit diagram showing a detailed construction of a target rack position arithmetic circuit.

The target rack position arithmetic circuit 10 is operated to calculate the target rack position Rt with reference to the accelerator operation amount A, the engine rotational speed N, and the engine cooling water temperature Tw. Specifically, as shown in FIG. 2, the target rack position arithmetic circuit 10 comprises a primary arithmetic circuit 11, a full rack position arithmetic circuit 12, and a minimum value selection circuit 13.

Figure 3:
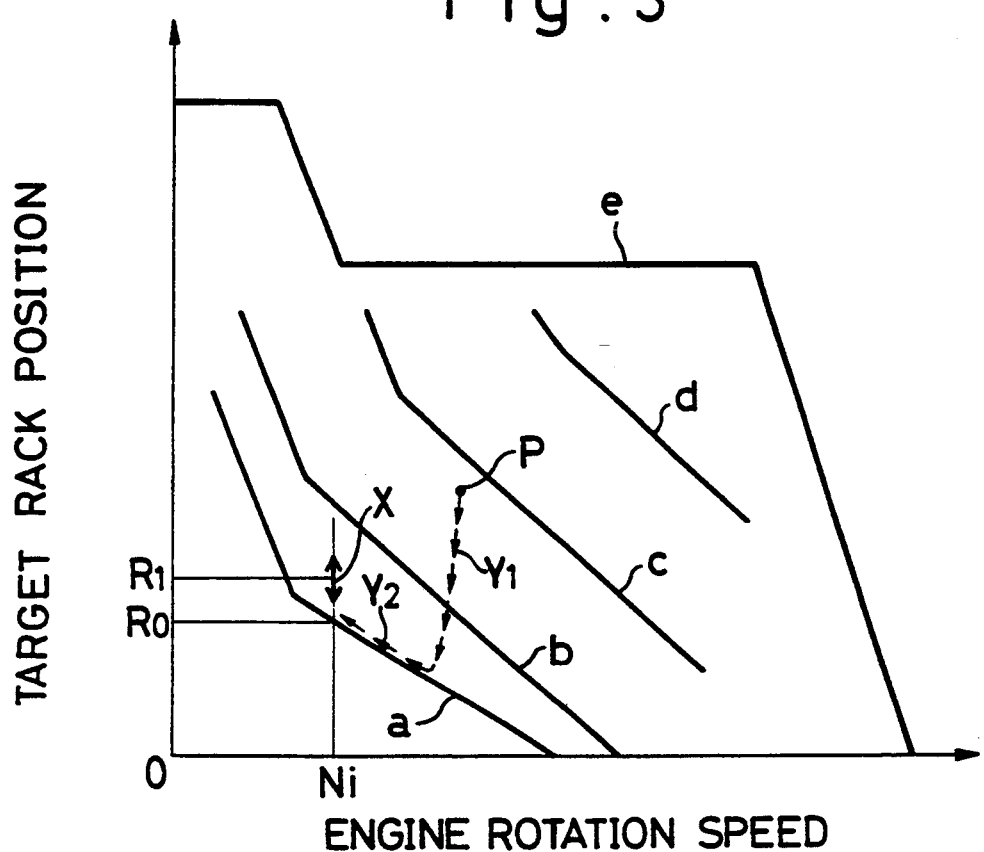
FIG. 3 is a view of a map showing lines for determining a target position of a control rack with reference to a rotational speed of an engine and an operation amount of an accelerator.

The primary arithmetic circuit 11 is operated to calculate a primary target rack position Rd in accordance with the engine rotational speed N and the accelerator operation amount A with reference to a map. FIG. 3 depicts a schematic view of this map. Predetermined relations between the engine rotational speed N and the primary target rack position Rd are represented by different lines which are drawn for different accelerator operation amounts respectively. For the purpose of explanation, the accelerator operation amount is referred to as 100% when the accelerator operation amount is maximum. Lines are represented by the characters a, b, c, and d, respectively, when the accelerator operation amounts are 0%, 25%, 50%, and 75%. The above four lines a, b, c, and d show representative examples in the map, and lines for accelerator operation amounts other than the above-mentioned amounts are of course included in the map. In FIG. 3, the lines a, b, c, and d are partly shown (in other words, each line has an extension which is intendedly not shown in FIG. 3), respectively, for the purpose of simplification of the drawing. As apparent from each line a, b, c, and d, it is set such that a numerical value indicative of the primary target rack position Rd becomes smaller (in other words, the primary target rack position Rd is shifted in the fuel supply amount reducing direction), as the rotational speed N is increased. Further, as apparent from a comparison among the lines a, b, c, and d, the numerical value indicative of the primary target rack position Rd is increased (in other words, the primary target rack position Rd is shifted in the fuel supply amount increasing direction) as the accelerator operation amount is increased. In the primary arithmetic circuit 11, the primary target rack position Rd calculated in accordance with the map is corrected in accordance with the engine cooling water temperature Tw. The primary target rack position Rd thus obtained while an idling control is not undergoing, is directly sent to the minimum selection circuit 13.

The full rack position arithmetic circuit 12 is operated to calculate an upper limit value (i.e., full rack position Rf) of the position of the control rack 3a corresponding to the rotational speed N of the engine 1. A relation between this rotational speed N and the full rack position Rf is shown by a line e of FIG. 3.

In the minimum value selection circuit 13, a smaller rack position out of the primary target rack position Rd and the full rack position Rf is selected so as to be outputted as the target rack position Rt. In other words, the target rack position Rt is basically coincident with the primary target rack position Rd. When the primary target rack position Rd exceeds the full rack position Rf, the full rack position is served as the target rack position Rt.

The target rack position arithmetic circuit 10 substantially includes target idling position arithmetic means for calculating the target rack position when the idling control is undergoing. More specifically, the target rack position arithmetic circuit 10 comprises a first correction circuit 20 which is additionally employed in order to perform the idling control. This first correction circuit 20 comprises a target idling rotational speed arithmetic circuit 21, a deviation arithmetic circuit 22, a PID arithmetic circuit 23, and a adder circuit 24.

The target idling rotational speed arithmetic circuit 21 is operated to calculate a target idling rotational speed Ni in accordance with the engine cooling water temperature Tw when the idling control is undergoing. That is, when the engine cooling water temperature Tw is equal to or more than a predetermined temperature, the target idling rotational speed Ni is a predetermined speed $N_0$. When the engine cooling water temperature Tw is lower than the predetermined temperature, the target idling rotational speed Ni is higher than $N_0$ and becomes higher as the engine cooling water temperature Tw becomes lower.

In the deviation arithmetic circuit 22, a deviation between the target idling rotational speed Ni and the actual rotational speed N is calculated. The PID arithmetic circuit 23 performs a PID calculation (proportional, integral, and differential calculation) in accordance with this deviation. The PID calculation result Rp is always a plus value or zero. In the case where the result becomes minus through a normal PID calculation, the PID arithmetic circuit 23 outputs zero. The calculation result Rp of the PID arithmetic circuit 23 has the same dimension as the rack position. In the adder circuit 24, the primary target rack position Rd is corrected by adding the PID calculation result Rp to the primary target rack position Rd, and the corrected rack position is sent to the minimum value selection circuit 13. In this way, the rotational speed N of the engine 1 can be brought to the target idling rotational speed Ni.

In the case where the accelerator operation amount is not 0%, the target idling rotational speed Ni of the target idling rotational speed arithmetic circuit 21 is made to zero, and the PID calculation result Rp of the PID arithmetic circuit 23 also becomes zero.

The idling control will be described in more detail. A numerical value indicative of the primary target position $R_0$ (hereinafter referred to as the "base position") obtained at the target idling rotational speed Ni in accordance with the line a is somewhat smaller than a position $R_1$ of the control rack 3a necessary to maintain the target idling rotational speed Ni (see FIG. 2). As a consequence, when the idling control is undergoing, the PID arithmetic circuit 23 is normally functioned effectively to output a plus PID calculation result Rp, and therefore the engine rotational speed N can be maintained in the level of the target idling rotational speed Ni. In that condition, the control rack 3a is slightly shifted in the fuel supply amount reducing direction and in the fuel supply amount increasing direction with reference to the above position $R_1$. This shifting is shown in its exaggerated form as indicated by an arrow X of FIG. 3. In the condition that the accelerator operation amount is large and the engine rotational speed is also high (as indicated by the character P of FIG. 3), when the accelerator pedal 5 is released, as indicated by an arrow $Y_1$ of FIG. 2, the primary target rack position is abruptly reduced as a result of an abrupt reduction of the accelerator operation amount. Then, the primary target rack position is calculated in accordance with the line a. At this time, a change of the primary target rack position is indicated by an arrow $Y_2$. Since the PID calculation result Rp is zero at this time, a numerical value indicative of the primary target rack position is never smaller than the line a. Consequently, an undershoot of the fuel injection amount does not occur. When the engine rotational speed N goes below the target idling rotational speed Ni after the accelerator pedal 5 is released, the PID arithmetic circuit 23 begins to function substantially to maintain the engine rotational speed N in the level of the target idling rotational speed Ni as above mentioned.

Figure 4:
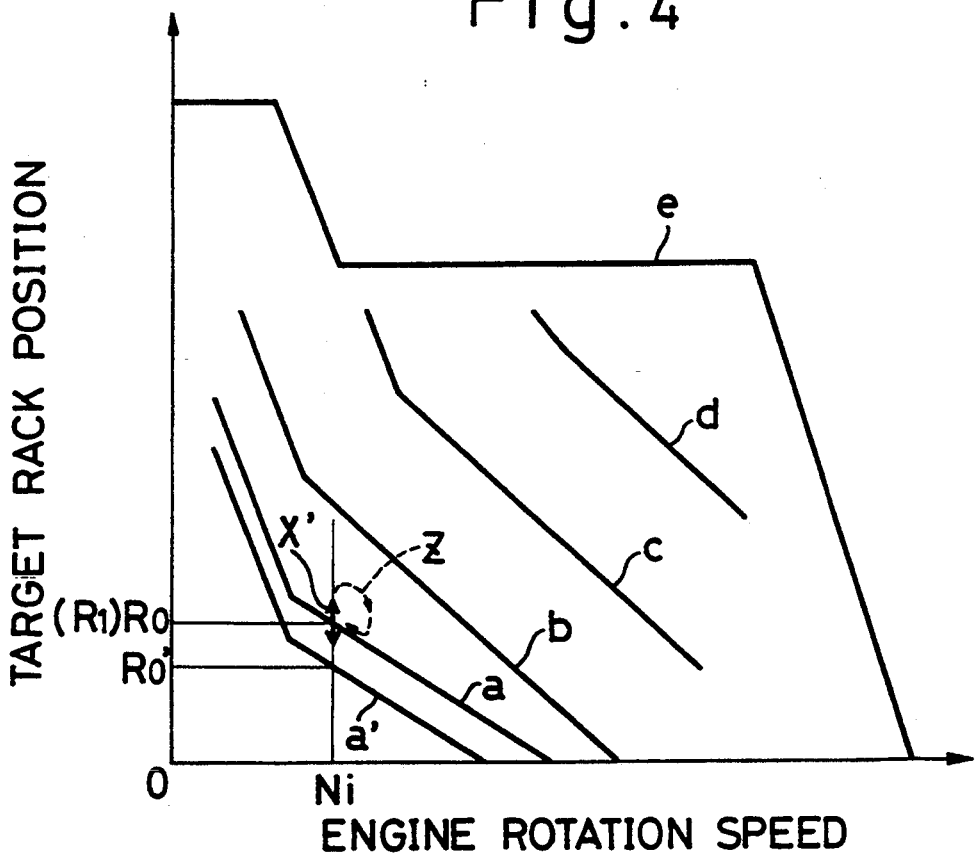
FIG. 4 is a view showing a relation between the above map and the result obtained by the features of the present invention.

The above construction and function are known by the Japanese Laid-Open Patent Publication No. 190639/85. The features of the present invention reside in the fact that a second correction circuit 30 is employed as an additional component part for achieving the idling control. First, prior to a description of the second correction circuit 30, all inconveniences which would occur when the second correction circuit 30 is not employed, will be described. When a valve opening pressure of each injection nozzle is lowered as a result of use of the fuel supplying device for a long period of time, the numeral value indicative of the position $R_1$ of the control rack 3a required for rotating the engine 1 at the target idling rotational speed Ni becomes smaller as shown in FIG. 4 compared with the case of FIG. 3. In FIG. 3, for the purpose of simplification of the drawing, the position $R_1$ is coincident with the base position $R_0$. In this case, the PID arithmetic circuit 23 is not always functioned. When the plus condition of the PID calculation result Rp lasts for a certain period of time, the engine rotational speed N exceeds the target idling rotational speed Ni. When this exceeded condition lasts, the PID calculation result becomes zero, and therefore the target rack position is determined only by the line a. As a result, the engine rotational speed N is lowered toward the target idling rotational speed Ni. When the engine rotational speed N goes below the target idling rotational speed Ni, the plus PID calculation result is added again. This cycle is indicated by a character Z in FIG. 4. As apparent from FIG. 4, the engine rotational speed N is not maintained in the level of the target idling rotational speed Ni and becomes unstable. When the numerical value indicative of the above position $R_1$ is further lowered, the PID arithmetic circuit t 23 becomes substantially non-functioned. Since the target rack position is normally determined only by the line a, the engine rotational speed becomes more unstable.

The second correction circuit 30 is employed in order to prevent such inconveniences as mentioned above from occurring. More specifically, the second correction circuit 30 comprises an idling detection circuit 31, a switch 32, an average value arithmetic circuit 33, a positional deviation arithmetic circuit 34, and a subtraction circuit 35.

The idling detection circuit 31 judges that the engine is in an idling condition when all of the following three conditions are satisfied.

$|N - N_0| \leq \Delta N$ $A = 0\%$ $Tw \leq Tr$ wherein $\Delta N$ and Tr are constants respectively.

When the idling detection circuit 31 judges that the idling condition for satisfying the above conditions is maintained for a predetermined standby time (for example, 1 second), the idling detection circuit 31 turns ON the switch 32. On the other hand, when the idling detection circuit 31 judges that the above conditions are not satisfied, the idling detection circuit 31 turns OFF the switch 32.

The average value arithmetic circuit 33 is operated to calculate an average value Rv of the actual rack position Ra of the control rack 3a detected by the rack position detection circuit 9. This average value Rv is substantially coincident with the rack position $R_1$ of FIGS. 3 and 4. The average value Rv is an average of values representing the actual rack position Ra in a predetermined period of time before the current time. This predetermined period of time is preferably within the standby time of the idling detection circuit 31.

The average value Rv of the actual rack position Ra is outputted to the positional deviation arithmetic circuit 34. The positional deviation arithmetic circuit 34 is operated to calculate a positional deviation $\Delta R$ ($= Rs - Rv$) between the average value Rv and a preset reference rack position Rs. Here, the reference rack position Rs is coincident with the rack position $R_1$ (FIG. 3) required to obtain the target idling rotational speed $N_0$ not long after the fuel supply device is delivered. The positional deviation $\Delta R$ is sent, as a correction value, to the subtraction circuit 35 through the switch 34. In the subtraction circuit 35, the primary target position is corrected by subtracting the correction value $\Delta R$ from the primary target position Rd.

The subtracting operation by the correction value $\Delta R$ in the subtraction circuit 35 is performed only when the switch 32 is turned ON (that is, only when the idling detection circuit 31 detects the idling condition).

As apparent from the above description, the primary target rack position Rd calculated by the primary arithmetic circuit 11 is corrected by the change $\Delta R$ of the rack position $R_1$ required to obtain the target idling rotational speed from the reference rack position Rs. Accordingly, it seems as if the primary arithmetic circuit 11 made a calculation of the primary target rack position Rd using a line a' obtained by a translational motion by the change $\Delta R$ from the line a. In other words, this means that the numerical valve indicative of the base position is lowered from $R_0$ to $R_0'$. As a consequence, a difference between the rack position $R_1$ of FIG. 4 for rotating the engine at the target idling rotational speed Ni, and the base position $R_0'$ can be brought equal to a difference between the rack position $R_1$ of FIG. 3 for rotating the engine at the target idling rotational speed Ni and the base position $R_0$. As a consequence, the PID arithmetic circuit 23 normally takes a plus value, and the control made by the PID arithmetic circuit 23 can be maintained. Therefore, the engine rotational speed N can stably be maintained in the level of the target idling rotational speed Ni.

The present invention is not limited to the above embodiment, and various modifications can be made without departing from the scope of the invention. For example, instead of the target rack position arithmetic circuit 10, or instead of the target rack position arithmetic circuit 10, the deviation arithmetic circuit 51 and the PID arithmetic circuit 52, a microcomputer of one chip may be used.

The subtraction circuit 35 may have a rewritable or reloadable nonvolatile memory such as, for example, EEPROM. In this case, the memory content is rewritten whenever a correction value $\Delta R$ is inputted, and that correction value $\Delta R$ is maintained until another correction value $\Delta R$ is inputted next. This shifting of the rack position is shown in its exaggerated form as indicated by an arrow X' of FIG. 4.

In the above embodiment, although the positional deviation $\Delta R$ ($= Ra - Rv$) is subtracted directly from the primary target rack position Rd, a constant correction value may be subtracted from the primary target rack position when the positional deviation $\Delta R$ exceeds a predetermined threshold value. It may also be possible to provide an arrangement in that a reference deviation $\Delta R_s$ is set, and a predetermined correction value is subtracted from the primary target rack position when a difference between the reference deviation $\Delta R_s$ and the positional deviation $\Delta R$ exceeds a predetermined threshold value. It may also be possible to provide an arrangement in that a correction value proportional to the difference between the reference deviation $\Delta R_s$ and the positional deviation $\Delta R$ is subtracted from the primary target rack position.

In the above embodiment, after the correction value $\Delta R$ is subtracted from the primary target position Rd, the subtracted primary target position is added with the PID arithmetic result Rp. However, the adding operation may come before the subtracting operation.

The present invention may be applied to an electronic governor for controlling a control sleeve (adjustment member) of a distribution type fuel injection pump. The invention is likewise applicable to an electric governor of a fuel supplying device for a gasoline engine.

What is claimed is:

1. An electronic governor of a fuel supplying device for an engine, said governor being operated to control an adjustment member for adjusting an amount of supply of fuel to said engine, comprising:
   (a) position detection means for detecting a position of said adjustment member;
   (b) rotational speed detection means for detecting a rotational speed of said engine;
   (c) accelerator operation amount detection means for detecting an operation amount of an accelerator;
   (d) target position arithmetic means for calculating a target position of said adjustment member in accordance with the detected operation amount of said accelerator and also with the detected rotational speed of said engine; and
   (e) position control means for controlling the position of said adjustment member so that the position of said adjustment member detected by said position detection means is coincident with the target position calculated by said target position arithmetic means;
   wherein said target position arithmetic means includes target idling position arithmetic means for calculating the target position of said adjustment member when the operation amount of said accelerator is zero, said target idling position arithmetic means comprising:
   (i) primary arithmetic means for calculating a primary target position of said adjustment member in accordance with the detected rotational speed of said engine with reference to a predetermined relation between the rotational speed of said engine and the position of said adjustment member where the supply amount of fuel is reduced as the rotational speed of said engine is increased;
   (ii) first correction means for correcting said primary target position by using a first position correction component in a fuel supply amount increasing direction, such that the rotational speed of said engine detected by said rotational speed detection means is coincident with a target idling rotational speed; and
   (iii) second correction means for correcting said primary target position by using a second position correction component in a fuel supply amount reducing direction in such a manner as to correspond to the position of said adjustment member detected by said position detection means when an idling control is undergoing.

2. The electronic governor according to claim 1, in which said first correction means comprises deviation arithmetic means for calculating a deviation between the rotational speed of said engine detected by said rotational speed detection means and the target idling rotational speed, and arithmetic means for performing at least a proportional calculation and an integral calculation in accordance with said deviation to obtain said first position correction component.

3. The electronic governor according to claim 1, in which said second correction means comprises average value arithmetic means for calculating an average value of the positions of said adjustment member detected by said position detection means in a predetermined period of time when the idling control is undergoing, and positional deviation arithmetic means for calculating a positional deviation between said average value and a reference position, said second position correction component of said adjustment member being obtained in accordance with said positional deviation.

4. The electronic governor according to claim 3, in which said second correction means provides said positional deviation directly as said second position correction component.

5. The electronic governor according to claim 3, in which said second correction means provides said second position correction component of a predetermined value when said positional deviation exceeds a predetermined threshold value.

6. The electronic governor according to claim 3, in which said second correction means provides said second position correction component of a predetermined value when a difference between said positional deviation and a predetermined reference deviation exceeds a predetermined threshold value.

7. The electronic governor according to claim 3, in which said second correction means provides said second position correction component proportional to a difference between said positional deviation and a predetermined reference deviation.

* * * * *